Dec. 23, 1941.  D. W. PAULSEN  2,267,131
AUTOMATIC TRANSMISSION
Filed Dec. 31, 1940  4 Sheets-Sheet 1

Inventor
Donald W. Paulsen
By Clarence A. O'Brien
Attorney

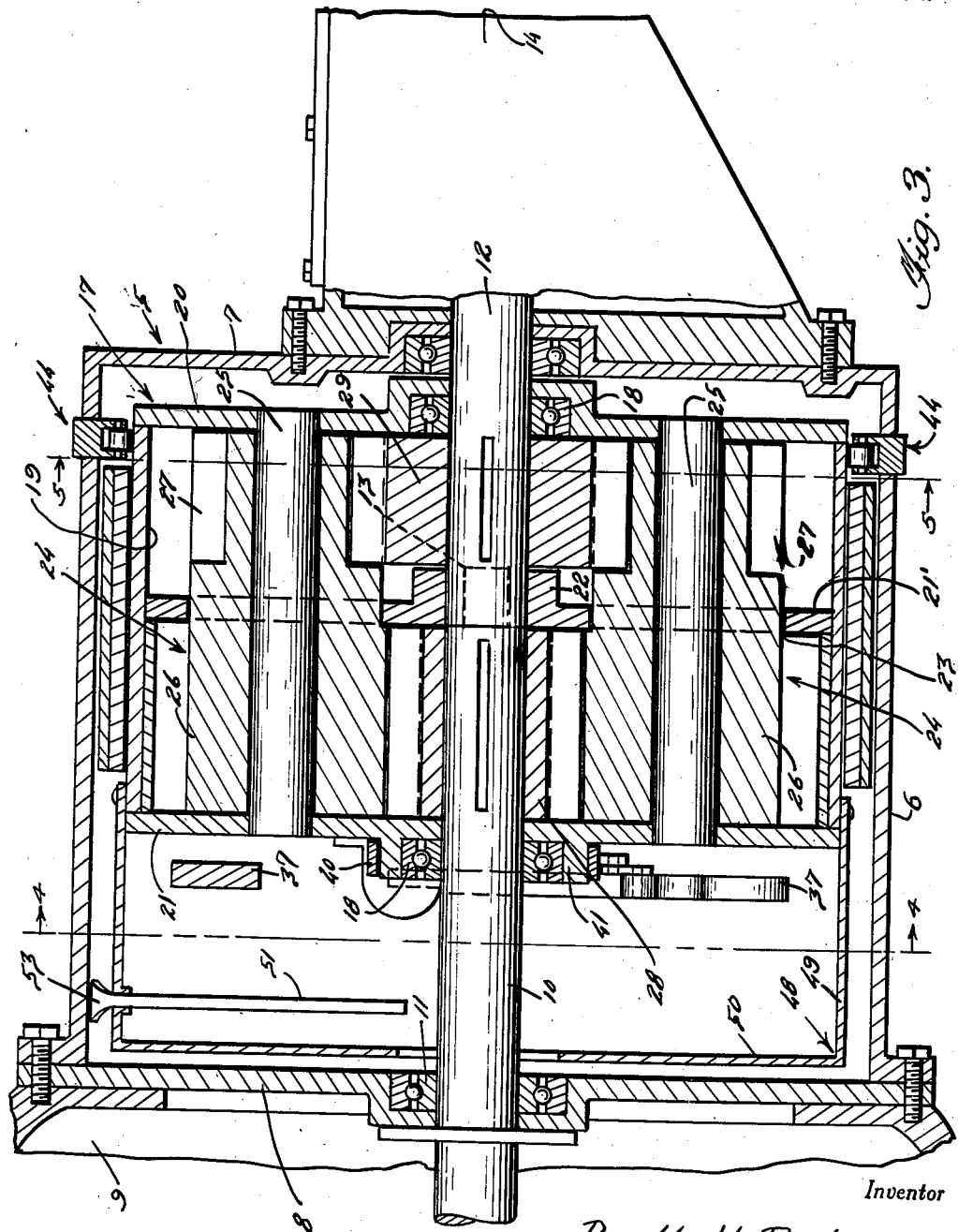

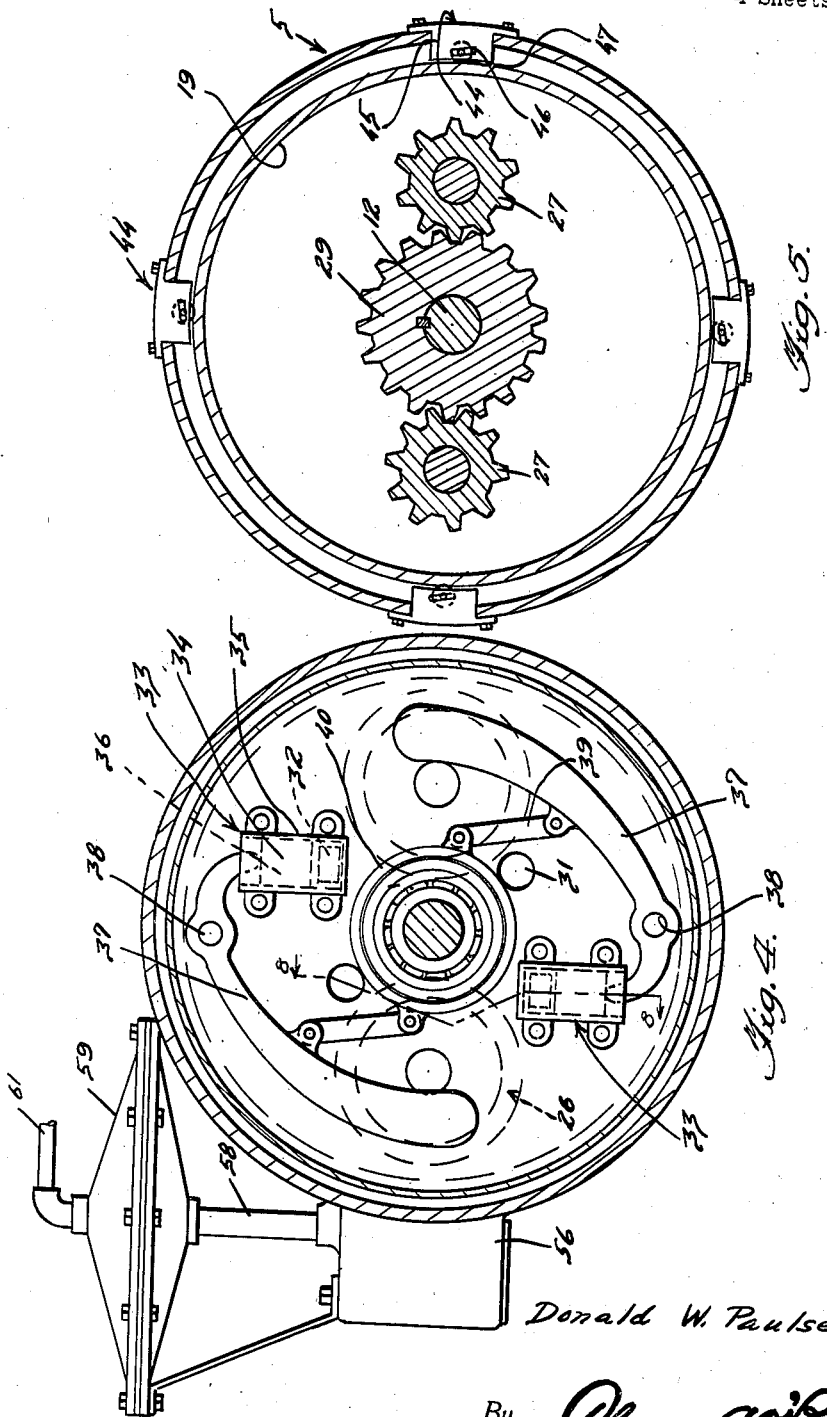

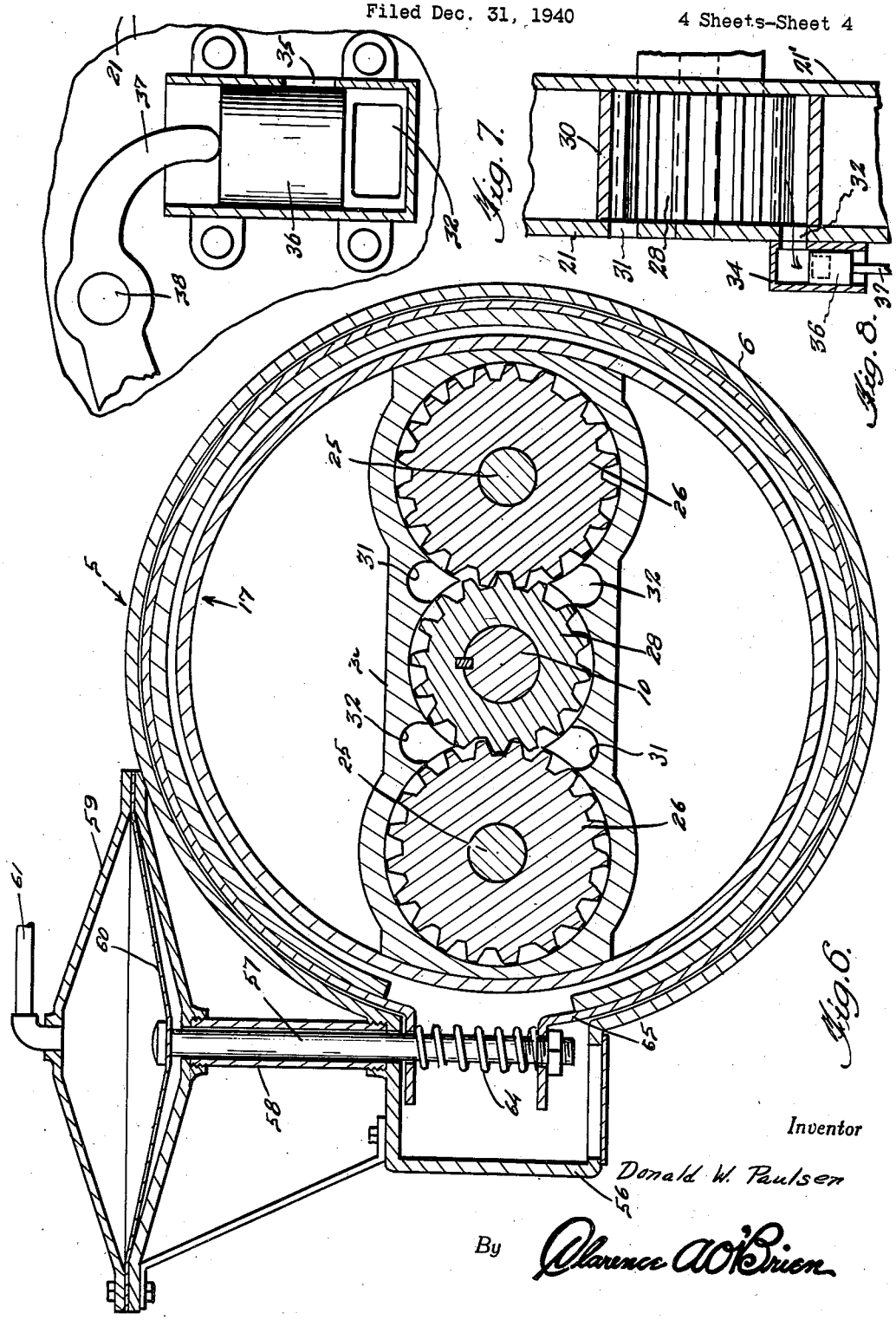

Patented Dec. 23, 1941

2,267,131

UNITED STATES PATENT OFFICE 2,267,131

AUTOMATIC TRANSMISSION

Donald W. Paulsen, Los Angeles, Calif.

Application December 31, 1940, Serial No. 372,659

5 Claims. (Cl. 74—294)

This invention relates to an automatic transmission of the fluid type to be employed between power and load shafts, and has for the primary object the provision of a device of this character which will automatically provide variable speeds between said shafts from a low speed of approximately three to one reduction ratio between said shafts to a direct drive between the shafts and controlled in accordance with the speeds of rotation of the drive shaft which is responsive to the variance in power delivered thereto with the variance in loads on the load shaft, such as would occur in a motor vehicle when traveling on level and up steep grades or starting from a standstill either on level ground or on an upgrade.

Another object of this invention is the provision of means for providing a reverse between the drive and load shafts with an approximately three to one reduction ratio between said drive shaft and the load shaft.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation illustrating an automatic transmission constructed in accordance with my invention.

Figure 3 is a sectional view taken on the line 3—3 of Figure 1.

Figure 4 is a transverse sectional view taken on the line 4—4 of Figure 3.

Figure 5 is a transverse sectional view taken on the line 5—5 of Figure 3.

Figure 6 is a transverse sectional view taken on the line 6—6 of Figure 1.

Figure 7 is a fragmentary sectional view illustrating one of the valves.

Figure 8 is a detail sectional view taken on the line 8—8 of Figure 4.

Figure 1:
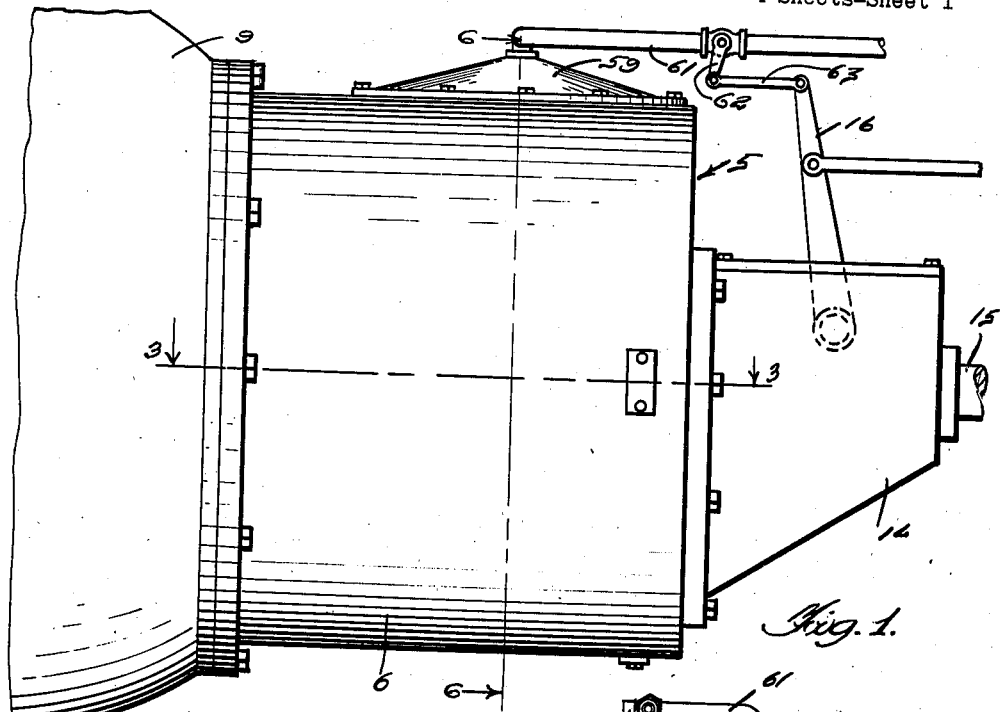
Figure 2:
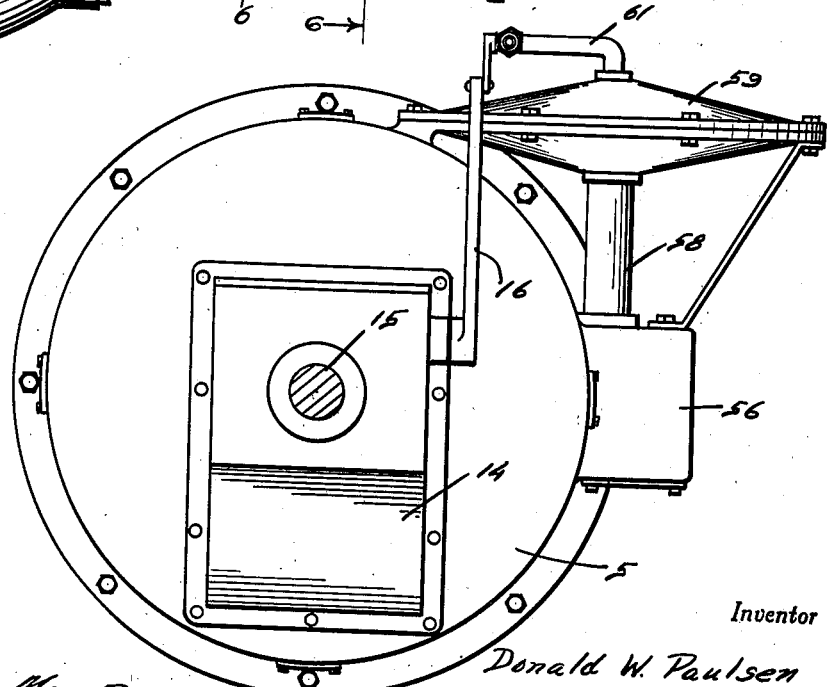
Figure 2 is an end view partly in section illustrating the same.

Referring in detail to the drawings, the numeral 5 indicates a main housing which is adapted to contain liquid and to be filled approximately three-quarters full and includes a peripheral wall 6, an integral end wall 7 and a removable end wall 8 to which is detachably secured a bell housing 9 forming a part of a prime mover (not shown) and in which is usually located a clutch for connecting and disconnecting the prime mover to a power shaft 10. The end walls 7 and 8 are provided with aligned bearings 11. The bearing of the end wall 7 rotatably supports a load shaft 12 and the bearing of the end wall 8 rotatably supports the power shaft 10 which is piloted into the load shaft, as shown at 13.

Removably mounted on the rear wall 7 is a reverse gear mechanism 14 of a conventional construction to which the load shaft 12 is connected and also a propeller shaft 15. The detail construction of the reverse gear mechanism is immaterial as far as this present invention is concerned as long as reverse may be obtained between the shafts 12 and 15.

A control lever 16 of the reverse gear is capable of having a forward, neutral and reverse position and may be operated from a remote point such as within an automobile or motor vehicle body.

A rotor in the form of a drum is designated by the character 17 and is located for rotation within the housing 5 and is rotatably supported by the drive and load shafts 10 and 12, bearings 18 being provided between the shafts 10 and 12 and the rotor. The rotor as before stated is in the form of a drum including a peripheral wall 19 and removable end walls 20 and 21. Located within the rotor and supported by the peripheral wall 19 thereof is a divisional plate 21' provided with a centrally arranged bearing 22 in which is journaled the load shaft where the drive shaft pilots into said load shaft and also is provided with gear openings 23 through which extend gear units 24 journaled on shafts 25 supported by the end walls 20 and 21.

Each gear unit 24 includes a gear 26 integral with a gear 27. The gears 26 of said gear units 24 are in continuous mesh with a drive gear 28 keyed on the power shaft 10. The gears 27 of the gear units 24 are in continuous mesh with a load gear 29 keyed on the load shaft 12. The gears 26, 27, 28 and 29 coact in providing a speed gear reduction of approximately three to one between the drive shaft and the load shaft when the rotor is non-rotating or barely rotating with relation to the drive shaft.

The gears 26 and 28 coact with a gear housing 30 in forming a gear pump for the purpose of circulating the fluid or liquid into and out of the rotor. The end wall 21 of the rotor is provided with inlet ports 31 to admit liquid from the housing 5 to the gears 26 and 28 which are acting as pump gears. The end wall 21 of the rotor is also provided with outlet ports 32 connecting with pump housing 30 or the liquid output from the pump gears to valves 33 supported on the end wall 21 and in the form of cylinders 34 having outlets 35 connecting with the housing 5 and slidable pistons 36 therein for opening and closing the outlets 35 to the ports 32. The pistons 36 are engaged by pivotally mounted weighted arms 37 forming a part of a governor mechanism. The weighted arms are pivoted on the end wall 21, as shown at 38, and have pivoted thereto links 39 which are in turn pivoted to a collar 40 journaled on a flange 41 which provides a support for the bearing 18 carried by the end wall 21. The connection described between the weighted arms will cause said arms to move in unison and it is to be understood that the arms are thrown outwardly by centrifugal force which movement tends to move the pistons into position of closing the ports 35 to the ports 32 and cutting off the escape of liquid from the pump gears. When this occurs the rotor becomes locked to the drive and load shafts, consequently establishing a direct drive between said shafts. However, it is to be understood that the liquid pressure from the pump gears tends to move the pistons in a direction of communicating the ports 35 and 32, this occurring of course when the drive shaft 10 is rotating.

To prevent the rotor 17 from rotating in a reverse direction to the direction of rotation of the drive shaft 10 automatic holding devices 44 are provided. The rotation of the rotor in a reverse direction to the direction of rotation of the power shaft will occur when the shaft 12 is under a heavy load and the drive shaft starts to rotate by the power delivered thereto from the prime mover. Therefore, the holding devices 44 automatically come into play to prevent this reverse rotation of the rotor and each consists of a mounting 45 secured on the housing 5 and provided with inclined slots 46 in which are slidably and rotatably mounted rollers 47 that contact the peripheral wall 19 of the rotor and whenever the rotor starts the reverse rotation referred to the rollers wedge therewith and prevent said reverse rotation. However, when the rotor rotates in the same direction with the drive shaft the rollers free themselves of the rotor by sliding in the slots 46, the latter being disposed on a slight inclination.

A shield 48 is secured to one end of the rotor and includes a peripheral wall 49 and an end wall 50, the latter being apertured to permit the drive shaft to extend therethrough. Carried by and extending into the shield is a series of vent tubes 51 for the purpose of bleeding the shield of air and the outer ends of said tubes are in the form of scoops, as shown at 53, for the purpose of picking up liquid in the housing 5 and directing the same into the shield for furnishing liquid to the pump gears by way of the ports 31 and also act as means of sustaining rotation of the liquid in the housing 5 during the operation of this device for the purpose of cutting down resistance to the rotor.

In operation, the power shaft is clutched to the prime mover which starts the rotation of said power shaft and through gears 26, 27, 28, and 29 the load shaft 12 is rotated at substantially a three to one reduction over the speed of the rotation of the drive shaft. Through gears 26, 28 the liquid is pumped into the cylinders 34 under pressure causing the pistons 36 to open ports 35. As the speed of power shaft and gears 26, and 28 increase, the pressure at port 35 also increases until enough back pressure is created by the fluid against gears 26 and 28 to start the rotor rotating in the same direction as the power shaft. As the speed of the rotor increases the weighted arms 37 of the governor mechanism swings outwardly forcing the pistons to gradually close the ports 35. When ports 35 are fully closed then the output of liquid from the pump gears is stopped and brings about locking of the rotor to the drive and driven shafts and consequently establishing a direct drive between the drive shaft and the load shaft.

Should the load on the load shaft increase to such an extent that it would slow down the number of revolutions of the power shaft the speed of rotation of the rotor accordingly decreases and the weighted arms of the governor mechanism move inwardly permitting the pressure of the liquid from the pump gears to move the valves to partly open the ports 35 consequently bringing about a speed reduction drive between the power and driven shafts.

An auxiliary housing 56 is located on the housing 5 and in communication therewith and receives a slidable rod 57 which is slidably supported in a sleeve 58 mounted on the auxiliary housing 56. A diaphragm housing 59 is supported by the sleeve 58 and has located therein a diaphragm 60 to which the rod 57 is connected. The diaphragm housing 59 is connected with a vacuum source such as the intake manifold of an engine by a pipe 61 and located in the pipe 61 is a control valve 62 connected to the control lever 16 of the reverse gear mechanism by a link 63 so that whenever the control lever 16 is placed in a reverse position the valve 62 will be opened placing the interior of the diaphragm housing in communication with the vacuum source which will act to move the diaphragm and rod 57 in one direction against the action of a coil spring 64 for the purpose of contracting a brake band 65 on the peripheral wall of the rotor for the purpose of preventing the rotor from rotating when reverse rotation is desired between the load shaft 12 and the propeller shaft 15, consequently permitting the propeller shaft to be driven at approximately a three to one ratio with respect to the speed of rotation of the drive shaft.

When the vacuum source is closed to the diaphragm housing 59 the diaphragm returns to normal position and the contractible brake band expands against the housing 5 and is supported thereby. The brake band is of the split type having the apertured ends to receive the rod 57 and between which is located the spring 64, the latter being supported on the rod 57.

In some uses of this device it may be desirable to eliminate the reverse gear mechanism and when this is omitted the valve 62 is manually operated should it be desired to secure the rotor against rotation for the purpose of providing a low speed drive between the drive shaft 10 and the load shaft regardless of the speed of rotation of the drive shaft.

While I have shown and described the preferred embodiment of my invention, it will be understood that minor changes in construction, combination and arrangement of parts may be made without departing from the spirit and scope of the invention as claimed.

Having thus described the invention, what I claim is:

1. In an automatic fluid transmission, a housing containing a liquid, power and load shafts journaled in said housing, a rotor journaled in said housing and rotatably supported by said shafts, gears secured to said shafts, cluster gears connecting said first gears and coacting therewith to provide a gear reduction drive between the power shaft and the load shaft, a pump housing receiving one of the first gears and portions of the cluster gears to provide a liquid pump having direct communication with the housing to obtain liquid therefrom and provided with outlet ports, valves for controlling said outlet ports to the housing, a governor for opening and closing the valves and driven by said rotor, an automatic means between the housing and the rotor to prevent said rotor from rotating in a reverse rotation to the drive shaft under certain load conditions on the load shaft and during a certain number of revolutions of the drive shaft, a reverse gear mechanism connected to the load shaft supported by the housing and including a control shaft having neutral, forward and reverse positions, a self-expanding brake drum supported by the housing above said rotor, a vacuum operated means connected with said brake band supported by said housing and including a control valve connected to said control lever of the reverse gear mechanism to contract the brake band on the rotor to prevent rotation thereof when said lever is in reverse position.

2. In an automatic fluid transmission, a housing containing a liquid, power and load shafts journaled in said housing, a rotor journaled in said housing and rotatably supported by said shafts, gears secured to said shafts, cluster gears connecting said first gears and coacting therewith to provide a gear reduction drive between the power shaft and the load shaft, a pump housing supported by the rotor and receiving one of the first-named gears and portions of the cluster gears to coact therewith in forming a gear pump having direct communication with the housing and provided with outlet ports, cylinders carried by said rotor and connecting with the outlet ports and having outlet ports, pistons in said cylinders for opening and closing the outlet ports to each other, governor arms pivotally mounted on the rotor and engaging the pistons, a collar rotatably supported on the rotor, links connecting the governor arms to said collar.

3. In an automatic fluid transmission, a housing containing a liquid, power and load shafts journaled in said housing, a rotor journaled in said housing and rotatably supported by said shafts, gears secured to said shafts, cluster gears connecting said first gears and coacting therewith to provide a gear reduction drive between the power shaft and the load shaft, a pump housing supported by the rotor and receiving one of the first-named gears and portions of the cluster gears to coact therewith in forming a gear pump having direct communication with the housing and provided with outlet ports, valves for controlling the outlet ports, a governor for actuating the valves and driven by the rotor, a shield secured to one end of the rotor and having an opening to permit the power shaft to extend therethrough, and vent tubes extending through the shield and having scoop shaped ends located within the housing.

4. In an automatic fluid transmission, a housing containing a liquid, power and load shafts journaled in said housing, a rotor journaled in said housing and rotatably supported by said shafts, gears secured to said shafts, cluster gears connecting said first gears and coacting therewith to provide a gear reduction drive between the power shaft and the load shaft, a pump housing supported by the rotor and receiving one of the first-named gears and portions of the cluster gears to coact therewith in forming a gear pump having direct communication with the housing and provided with outlet ports, cylinders carried by said rotor and connecting with the outlet ports and having outlet ports, pistons in said cylinders for opening and closing the outlet ports to each other, governor arms pivotally mounted on the rotor and engaging the pistons, a collar rotatably supported on the rotor, links connecting the governor arms to said collar, a shield secured to one end of the rotor and having an opening to permit the power shaft to extend therethrough, and vent tubes extending through the shield and having scoop shaped ends located within the housing, automatic means carried by the housing and coacting with the rotor to prevent the latter from rotating in a reverse direction to the drive shaft and including mountings secured to said housing and rollers to contact the rotor and rotatably and slidably mounted in said mountings.

5. In an automatic fluid transmission, a housing containing a liquid, power and load shafts journaled in said housing, a rotor journaled in said housing and rotatably supported by said shafts, gears secured to said shafts, cluster gears connecting said first gears and coacting therewith to provide a gear reduction drive between the power shaft and the load shaft, a pump housing supported by the rotor and receiving one of the first-named gears and portions of the cluster gears to coact therewith in forming a gear pump having direct communication with the housing and provided with outlet ports, cylinders carried by said rotor and connecting with the outlet ports and having outlet ports, pistons in said cylinders for opening and closing the outlet ports to each other, governor arms pivotally mounted on the rotor and engaging the pistons, a collar rotatably supported on the rotor, links connecting the governor arms to said collar, a shield secured to one end of the rotor and having an opening to permit the power shaft to extend therethrough, vent tubes extending through the shield and having scoop shaped ends located within the housing, automatic means carried by the housing and coacting with the rotor to prevent the latter from rotating in a reverse direction to the drive shaft and including mountings secured to said housing and rollers to contact the rotor and rotatably and slidably mounted in said mountings, an expansible type brake band surrounding the rotor and supported by the housing, and a vacuum operated means connected to said brake drum for contracting the latter onto the rotor and including a control valve.

DONALD WM. PAULSEN.